Patented Aug. 13, 1935

2,011,317

UNITED STATES PATENT OFFICE 2,011,317

DEHYDROGENATION OF UNSATURATED ALCOHOLS

Herbert Peter Augustus Groll, Oakland, Calif., assignor to Shell Development Company, San Francisco, Calif., a corporation of Delaware No Drawing. Application May 8, 1933, Serial No. 670,029

9 Claims. (Cl. 260—134)

This invention relates to the catalytic dehydrogenation of unsaturated primary and secondary alcohols to the corresponding unsaturated aldehydes and ketones and is more specifically concerned with the dehydrogenation of unsaturated alcohols possessing the grouping

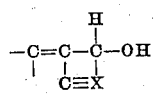

wherein the loose bonds may be taken up by hydrogen, alkyl, alkoxy, aryl, aryloxy, aralkyl, aralkoxy groups which may or may not be further substituted, and $x$ represents hydrogen, alkyl, aryl, or aralkyl groups which may or may not be further substituted. Isobutenol is the simplest member of this group. Another group of compounds is represented by the structure

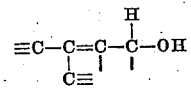

wherein the tertiary carbon atom is not adjacent to the carbinol group. The general formula for these compounds may be written as

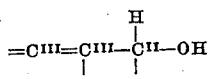

wherein at least one of the two carbon atoms $C^{III}$ is a tertiary one, i. e., it is linked to three other carbon atoms and wherein the carbon atom $C^{II}$ may be either of a primary or secondary character.

Allyl alcohol, which is the simplest isolated unsaturated alcohol, has been dehydrogenated by passage over copper at 180° to 300° C. The yield of acrylic aldehyde or acrolein, however, was negligible as the hydrogen derived from the decomposition of allyl alcohol served to hydrogenate the double bond of the unsaturated aldehyde formed. Consequently, propionic aldehyde was the main product. When the same alcohol was dehydrogenated over brass turnings at 600° C., the acrolein formed decomposed to carbon monoxide, propylene and apparently divinyl.

I have found that if allyl alcohol, preferably in the vapor phase, is contacted with a dehydrogenating catalyst at a temperature of from 300° C. to 550° C., undesirable side reactions are repressed and the main product is acrolein.

Within this temperature range, it is preferable to employ temperatures about the upper limit when resorting to a high space velocity of the allyl alcohol and to use temperatures about the lower limit with lower space velocities.

Space velocity is the hourly volume of gas flowing through the apparatus per unit volume of catalyst, under standard conditions of temperature and pressure.

The scientific and patent literature fail to disclose the dehydrogenation of unsaturated alcohols containing only one double bond and four or more carbon atoms to the molecule. These compounds may be regarded as the homologues of allyl alcohol such as

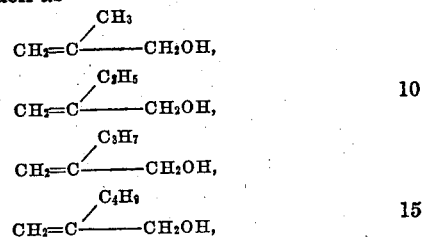

and the like or may be represented as their isomers

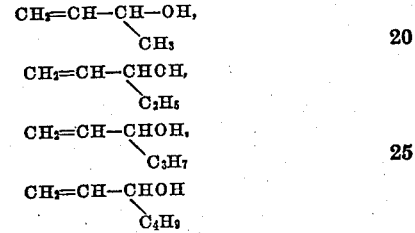

and the like, or may comprise compounds as follows:

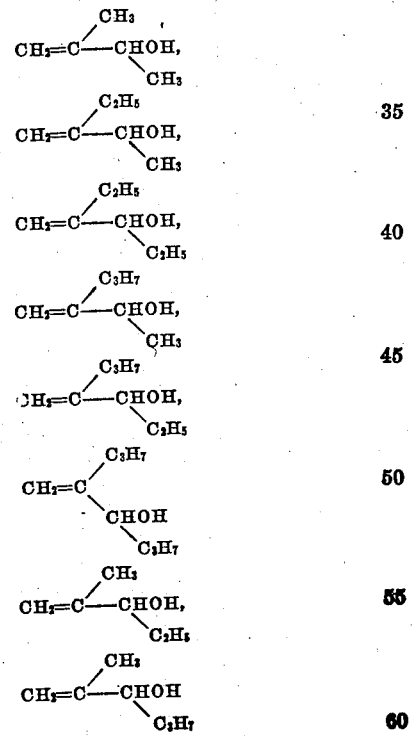

and the like. Other alcohols which are contemplated are those of the following character

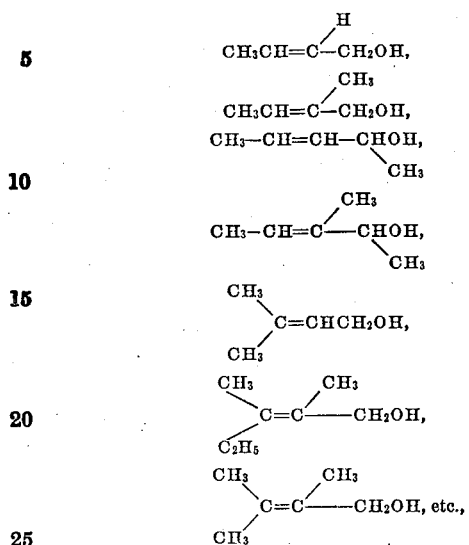

and their homologues. Instead of the alkyl derivatives, the aryl and aralkyl derivatives may be resorted to in which cases, the cyclic nuclei may be heterocyclic as well as carbocyclic.

Although my process can be conducted at atmospheric pressure or slightly higher, it is preferable to execute the same at or below atmospheric pressure, especially the latter as there is the double advantage of a more ready volatilization of the alcohols and a diminution of the reverse action of hydrogen and consequently an increase in the practical yield of unsaturated aldehydes and ketones. The process can also be executed at relatively lower temperatures when operating at subatmospheric pressures.

The exit vapors may be fractionated in a column whereby the more volatile aldehyde or ketone is separated from the less volatile alcohol and the latter recirculated, thus providing a continuous process in which the alcohol is substantially totally converted to the desired carbonyl product.

Standard dehydrogenation catalysts are suitable and they comprise, amongst others, activated copper, cobalt, iron, platinum, palladium, zinc, cadmium, manganese, lead, tin, silver, brass, brass spelter, zinc sulfide, zinc oxide, manganous oxide, stannous oxide, cadmium oxide, non-reducible or not easily reducible metal oxides, silver-zinc, silver-arsenic alloys, etc. Due to the olefinic nature of the reagents, care must be exercised in employing such dehydrogenation catalysts as favor dehydrogenation of carbinol groups to carbonyl groups more readily than catalyze the hydrogenation of olefinic bonds.

Brass is the most suitable catalyst and by the term "brass" is meant any copper-zinc alloy predominating in both components, although other metals may be present. Brass spelter solder is one variation of brass. Brass is not fouled by carbonaceous deposits and remains able to continue the reaction indefinitely. Copper activated by reduction from its oxide can be used and so can silver. The latter may be activated by amalgamating its surface with mercury and then heating to remove the mercury. Their lessened activity after use, can be restored by treatment with mercury. Zinc sulfide, prepared by heating zinc in hydrogen sulfide is also suitable.

It is seen that the most desirable catalysts are those which possess a moderate initial activity and freedom from a tendency to induce side reactions as well as freedom from deterioration as a result of sintering or of poisoning by impurities present in the gaseous mixture passed over the catalyst.

It is generally desirable to bring the catalytic material into suitable granular form by any available means which does not introduce harmful impurities. In some cases it may be desirable to support the catalyst upon some inert substance having itself no catalytic effect upon the reaction in which it is used.

As both sulfur and halogen are poisons, they should be removed from the alcohols, in which they may occur as impurities, as far as possible.

A convenient method of removing organically combined halogen and sulfur from unsaturated alcohols is to pass the alcohols over metals, such as can be used as catalysts, at such low temperatures or at such high space velocities that no noticeable conversion to carbonyl compounds can take place.

If there is present a tertiary carbon atom contiguous to a double bond in the molecule of the unsaturated alcohol undergoing treatment, temperatures higher than 600° C. can be resorted to since these alcohols and their reaction products are more stable than the straight chain or other olefine alcohols. The unsaturated alcohol containing the group

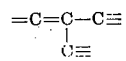

is less apt to be hydrogenated. Accordingly, the process is preferably worked at such temperatures and pressures at which the equilibrium of the reaction

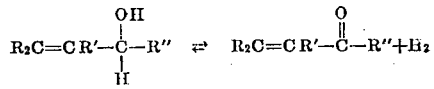

is as far as possible on the right side of the equation so that even with moderately active catalysts the reaction velocity becomes extremely high. These moderate catalysts only slowly catalyze the hydrogenation of olefinic bonds even at such temperatures. Therefore when using this principle, the alcohol vapors can be passed over the catalyst so rapidly that there is no time for any considerable conversion according to the reactions:

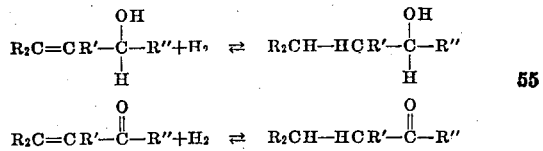

The practical upper limit of the reaction temperature is set by the occurrence of pyrolytic side reactions (cracking) at too high temperatures at the existing pressure.

Obviously the dehydrogenation of the carbinol group will be promoted and hydrogenation of the olefinic bond will be suppressed by reducing the reaction pressure below atmospheric. This measure may be useful in dehydrogenating at lower temperatures such unsaturated alcohols which would decompose when heated to the proper reaction temperature. Reduced pressures may also be applied at elevated temperatures for the production of unsaturated carbonyl compounds which are readily hydrogenated.

The terms "dehydrogenation" and "dehydrogenating" as used throughout the specification and claims are intended to exclude oxidation reactions in which oxygen or its equivalent is caused to react with hydrogen-containing compounds to form reaction products containing a less amount of hydrogen. The mechanism of oxidation reactions of this type is entirely different from that involved in reactions wherein hydrogen atoms are split off from hydrogen-containing compounds to produce molecular hydrogen.

For illustrative purposes only, reference will be had to several examples which typify preferred methods of dehydrogenating unsaturated alcohols.

Example I 581 gms. of isobutenol

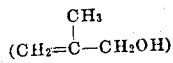

$(CH_2=\overset{CH_3}{\underset{|}{C}}-CH_2OH)$ were passed through a copper tube containing brass spelter, at an average rate of 5.4 c. c. per minute. The reaction space, heated to 500° C., was 65 cm. long and had a volume of 115 c. c.

The reaction product was fractionated; 218 gms. of methyl acrolein $(CH_2=\overset{CH_3}{\underset{|}{C}}-CHO)$, 320 gms. of unchanged isobutenol, and a small amount of an intermediate cut were separated.

The yield of methyl acrolein (in one pass) was 38.6% of the theoretical. 55% of the alcohol remained unchanged and was again passed through the tube with the same yield. The intermediate cut consisted of hydrogenated products and represented only 4% by wt. of the total.

Example II 60.3 gms. of 2-methyl-butene-1-ol 3

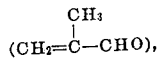

$(CH_3-\overset{OH}{\underset{|}{CH}}-\overset{CH_3}{\underset{|}{C}}=CH_2)$ were passed through a copper tube containing spelter at an average rate of 3 c. c. per min. The reaction space heated to 530° C. was 65 cm. long and had a volume of 51 c. c.

From the reaction product were separated by careful fractionation 27 gms. of methyl isopropenyl ketone $(CH_3CO\overset{CH_3}{\underset{|}{C}}=CH_2)$ 19.9 gms. of methyl isopropyl ketone, 6.2 gms. of 2-methyl butene-1-ol 3 (unchanged) and 2.5 gms. of 2 methyl butanol-3.

The yield of the unsaturated ketone was 46% of the theoretically possible. The unchanged alcohol was passed through the tube again with the same yield of the ketone.

Example III 98.8 gms. of butene-1-ol 3

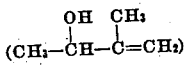

$(CH_3-\overset{OH}{\underset{|}{CH}}-CH=CH_2)$ were passed over spelter catalyst heated to 550° C. From the reaction product were separated 31.6 gms. of methyl vinyl ketone $(CH_3COCH=CH_2)$ besides some hydrogenated product. A very small amount of unchanged alcohol was found.

The yield of the unsaturated ketone was 33% of the theoretically possible.

Example IV

Isobutenol was passed over highly active copper at 285° C. at atmospheric pressure. The conversion was about 40% of the theoretical possible. The yield on the isobutenol converted was

|   | Per cent |
|---|---|
| Methyl acrolein | 24 |
| Isobutyraldehyde | 76 |

When the pressure was reduced to 160 mm. mercury while the temperature remained unchanged at 285° C. the yield was changed as follows:

|   | Per cent |
|---|---|
| Methyl acrolein | 53 |
| Isobutyraldehyde | 47 |

Example V

Isobutenol was passed over active copper at 350° C. The yields of products calculated on the isobutenol converted were:

|   | Per cent |
|---|---|
| Methyl acrolein | 64 |
| Isobutyraldehyde | 36 |

When the pressure was reduced to 160 mm. mercury the yield was changed as follows:

|   | Per cent |
|---|---|
| Methyl acrolein | 75 |
| Isobutyraldehyde | 25 |

Example VI

The secondary alcohol

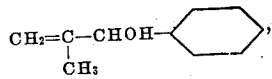

B. P. 222–240° C., (made from methyl acrolein and phenyl magnesium bromide) was passed over brass spelter at 530° C. The conversion calculated from the hydrogen formed was 48% of the alcohol. The isopropenyl phenyl ketone formed had a boiling point of about 200° C.

Example VII

Cinnamyl alcohol was passed at 550° C. over brass spelter. The conversion to cinnamic aldehyde in one pass was 57%. The recovery of unchanged alcohol was nearly 43%.

Example VIII 2-methyl butene-2 ol-4 (B. P. 138° C.), was passed over a brass catalyst at 530° C. 55% of the alcohol converted to the aldehyde per pass. The unchanged alcohol was recirculated through the tube. The product consisted of

|   | Per cent |
|---|---|
| ββ dimethyl acrolein | 94 |
| Isovaleraldehyde | 6 |

The products so obtained can be utilized as resin-forming bodies per se or by condensation with well-known agents as aldehydes, ketones, phenols, amines, ethers, etc. Further, the products obtained can be utilized to introduce alkenyl groups into organic compounds by condensation or by the use of organo metallo derivatives. The unsaturated compounds can also be oxidized to the corresponding acids and have varied uses in pharmaceutical chemistry.

While I have in the foregoing described in some detail the preferred embodiments of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

I claim as my invention:

1. A process for converting an unsaturated mono-olefinic alcohol containing the grouping

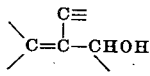

into its corresponding carbonyl compound which comprises passing said unsaturated alcohol in contact with a dehydrogenating catalyst at a temperature above 250° C.

2. A process for converting an unsaturated mono-olefinic alcohol, other than a tertiary carbinol, containing an unsaturated tertiary carbon atom into its corresponding carbonyl compound which comprises passing said unsaturated alcohol in contact with a dehydrogenating catalyst at a temperature above 250° C.

3. A process for converting isobutenol into methyl acrolein which comprises passing isobutenol in contact with a dehydrogenating catalyst at an elevated temperature.

4. A process for converting isobutenol into methyl acrolein which comprises passing isobutenol in contact with a dehydrogenating catalyst at an elevated temperature and subatmospheric pressure.

5. A process for converting 2 methyl butene-1-ol-3 into methyl isopropenyl ketone which comprises passing 2 methyl butene-1-ol-3 in contact with a dehydrogenating catalyst at an elevated temperature.

6. A process for converting an unsaturated alcohol, other than a tertiary carbinol, containing an unsaturated tertiary carbon atom and only one olefinic double bond to its corresponding carbonyl compound which comprises passing said unsaturated alcohol in contact with a dehydrogenating catalyst at an elevated temperature.

7. A process for converting an unsaturated mono-olefinic alcohol into its corresponding carbonyl compound which comprises passing an unsaturated alcohol containing an ethylene group which contains a tertiary carbon atom, said tertiary carbon atom being linked only to such carbon atoms which are not of a carbinol character, in contact with a dehydrogenating catalyst at a temperature above 250° C.

8. As a novel compound: α methyl acrolein.

9. As a novel compound: ββ dialkyl acrolein.

HERBERT PETER AUGUSTUS GROLL.